United States Patent
Andreani et al.

(10) Patent No.: US 10,203,063 B2
(45) Date of Patent: *Feb. 12, 2019

(54) INTERNAL ANTICORROSIVE AND ABRASIVE RESISTANT PROTECTION COATING FOR STEEL PIPES

(71) Applicant: PATAGONIA SHALE SERVICES S.A., Ciudad de Buenos Aires (AR)

(72) Inventors: Adrian Andreani, Ciudad de Buenos Aires (AR); Federico Noriega, Ciudad de Buenos Aires (AR)

(73) Assignee: Patagonia Shale Services, S.A., Bueno Aires (AR)

( * ) Notice: Subject to any disclaimer, the term of this patent is extended or adjusted under 35 U.S.C. 154(b) by 0 days.

This patent is subject to a terminal disclaimer.

(21) Appl. No.: 15/626,276

(22) Filed: Jun. 19, 2017

(65) Prior Publication Data

US 2018/0363832 A1 Dec. 20, 2018

(51) Int. Cl.
| | |
|---|---|
| *F16L 9/14* | (2006.01) |
| *F16L 58/10* | (2006.01) |
| *C09D 5/08* | (2006.01) |
| *F16L 9/02* | (2006.01) |
| *F16L 57/06* | (2006.01) |

(52) U.S. Cl.
CPC ............ *F16L 58/1009* (2013.01); *C09D 5/08* (2013.01); *F16L 9/02* (2013.01); *F16L 57/06* (2013.01)

(58) Field of Classification Search
CPC .......... F16L 9/02; F16L 58/1009; F16L 57/06
USPC .................................. 138/141, 146, 137, 36
See application file for complete search history.

(56) References Cited

U.S. PATENT DOCUMENTS

| | | | | |
|---|---|---|---|---|
| 3,126,298 | A * | 3/1964 | Patrick | C08G 59/62 148/251 |
| 5,152,323 | A * | 10/1992 | Shotts | B21C 37/09 138/143 |
| 5,520,223 | A * | 5/1996 | Iorio | B29C 63/486 138/137 |
| 6,161,989 | A * | 12/2000 | Kotani | B60P 3/002 138/146 |
| 7,107,662 | B1 * | 9/2006 | Levario | F16L 23/125 277/608 |
| 2002/0005223 | A1 * | 1/2002 | Campagna | F16L 9/147 138/146 |
| 2005/0257848 | A1 * | 11/2005 | Funatsu | F16L 57/005 138/146 |
| 2006/0108016 | A1 * | 5/2006 | Funatsu | B29C 63/34 138/141 |
| 2007/0267082 | A1 * | 11/2007 | Brandys | F16L 57/06 138/141 |
| 2009/0129853 | A1 * | 5/2009 | Pionetti | B05D 1/002 403/23 |
| 2009/0173408 | A1 * | 7/2009 | Mimura | B29C 63/34 138/143 |
| 2017/0204288 | A1 * | 7/2017 | Seeger | C09D 175/06 |

* cited by examiner

*Primary Examiner* — James Hook
(74) *Attorney, Agent, or Firm* — Defillo & Associates, Inc.; Evelyn A. Defillo

(57) ABSTRACT

The present invention relates to an inner anticorrosive and abrasive resistant coating (10) for steel pipes (1) used for the transport of fluids. The coating includes: a layer of epoxy resin (2) having free hydroxyl groups, which are applied directly to the inside 1*a* of the steel pipe (1); a layer of thermoplastic adhesive (3) applied directly onto the layer of epoxy resin; and a layer polyethylene (4), which is applied directly onto the layer of thermoplastic adhesive.

5 Claims, 3 Drawing Sheets

INTERNAL ANTICORROSIVE AND ABRASIVE RESISTANT PROTECTION COATING FOR STEEL PIPES

FIELD OF THE INVENTION

The present invention is related to an internal anticorrosive and abrasive resistant protection coating for steel pipes.

BACKGROUND OF THE INVENTION

The world market offers a great variety of coating options to protect the inner surface of pipes used for the transport of fluids from the effects of corrosion and erosion. Some, additionally, exhibit features that allow the reduction of friction and turbulence, thus, increasing the efficiency of flow. Among the alternatives to anticorrosive coatings, one can find those based on liquid epoxy; the epoxy coating is adhered by fusion and the special anticorrosive paints.

Among the main features of these coatings, they exhibit adaptation to corrosive environments, resistance to various solvents and chemical products, as well as to cathodic detachment.

The research on inner coatings along with the technical and metallurgic evolution required by pipes and accessories, has resulted in the development of coating that satisfies all kinds of needs.

A very common kind of coating is cement mortar lining, which fulfills the standards set forth in ISO 4179 and AWWA C104 for use in water distribution systems and sewerage systems. The ceramic epoxy coating for gravity-operated septic tanks and sewerage systems and the special inner coating for specific service conditions.

Inner cement lining is done by making the pipe rotate at high angular velocity coupled with vibration that produces a dense coating.

The high centrifugal speed allows the coating to become smooth, dense and perfectly compact.

The Hazen-Williams formula has determined that the coefficient of friction is 140 for cement linings and 150 for polyethylene and epoxy coatings.

Other anticorrosive and abrasive resistant protections consist in placing plastic liners inside the pipes. However, said liners are not adhered to the metal. They are simply attached at the ends of the pipe to avoid displacement.

Prior art shows a steel pipe inner coating made of high-density consolidated polyethylene. Also, prior art shows a steel pipe with an insulating inner coating and a fiber-filled thermoplastic liner placed inside a steel pipe.

Besides, prior art shows an inner coating for pipes made up of a highly heat-resistant TPU-Polyester lining which allows a nonwoven fabric to be saturated with an epoxy-amine resin and to be cured with steam or hot water.

There is a coating made up of a solixane-based elastomer processable by heat fusion, a coating made of a thermoplastic material, and a thermoplastic coating applied to the inside of the pipe by injecting gas that pushes the material against the inner surface of the pipe.

Even though all the known coatings in the field of technique yield the desired results for their specific purpose, the known coatings do not unfortunately include a plastic coating that can strongly adhere to pipes so that it can withstand pressure drops of the magnitudes present in oil and gas production pipelines.

In addition, the proposed solution in the preceding documents covers coatings with one or at most two external layers so as to obtain the mentioned protection. However, in the case of the present protection, it is made up a three-layer coating wherein each of the layers exhibits features that taken together afford a much superior protection compared to that of solutions in the prior art.

Nor does prior art show a coating that can make pipes impermeable to liquids and gases simultaneously.

In addition to solving the previous points, the proposed invention also shows a yet-inexistent procedure in the prior art, whereby a layer of adhesive thermoplastic is applied between an epoxy adhesive and material of the plastic pipe so as to achieve a full adherence of the various components and steel of the metal pipe.

Finally, neither is there in the state of the art, and the invention does describe this, a procedure that includes a step whereby a plastic pipe is pressed against the surface of the steel pipe, while simultaneously applying heat at a temperature higher than the point of softening of the thermoplastic material, but without damaging the material.

SUMMARY OF INVENTION

It is an object of the present invention to have a thermoplastic coating that adheres to the inside of pipes with such strength that it will counteract the strength of pressure drops present in oil and gas production pipelines.

It is another object of the revealed procedure that the inner coating of the steel pipe is impermeable to the transported liquids and gases.

It is another object of the present invention to provide a layer of thermoplastic adhesive between the epoxy layer and the material of the plastic pipe.

It is also an object of the present documentation to have a procedure including the steps to press the plastic pipe against the wall of the metal pipe while simultaneously applying temperature.

Finally, it is an object of this invention to have a steel pipe lined with an inner plastic pipe, and between said pipes there is a layer of adhesive and a layer of epoxy.

The present invention includes an anticorrosive and abrasive resistant inner coating for steel pipes used to transport fluids. The coating includes: a layer of epoxy resin having free hydroxyl groups, which is applied directly to the inside wall of the steel pipe; a layer of thermoplastic adhesive applied directly onto the layer of epoxy resin, the thermoplastic adhesive is anhydride modified polyolefin or acrylic acid modified polyolefin; and a layer of polyethylene, which is applied directly onto the layer of adhesive.

DETAILED DESCRIPTION OF THE INVENTION

With the aim to make the present invention comprehensible so that it can be applied easily, a precise description of the preferred method for manufacturing will be presented in the following paragraphs. Said description includes a diagram illustrating the invention.

Said description and diagram cannot be regarded in any way as limiting the invention. The components mentioned in the description can be selected among various equivalents, but without deviating from the principles of the invention set forth in the current documentation.

In the case described in the present documentation, it protects the steel pipe with a three-layer coating, which includes an epoxy resin and a plastic material with an in-between layer made up of an adhesive, which allows said three layers to bond and fuse with each other and the steel pipe.

Each of the component layers exhibits features that taken together afford a much superior protection compared to that of solutions in the prior art.

The present invention includes an inner anticorrosive and abrasive resistant coating for steel pipes used for the transport of fluids. The coating includes:

a layer of epoxy resin having free hydroxyl groups, which is applied directly to the inside of the steel pipe;

a layer of thermoplastic adhesive applied directly onto the layer of epoxy resin, the thermoplastic adhesive is anhydride modified polyolefin or acrylic acid modified polyolefin; and a layer of polyethylene which is applied directly onto the layer of adhesive.

Epoxy Resin

The epoxy resin used in the present invention may be any resin that contains free hydroxyl groups.

Figure 1:
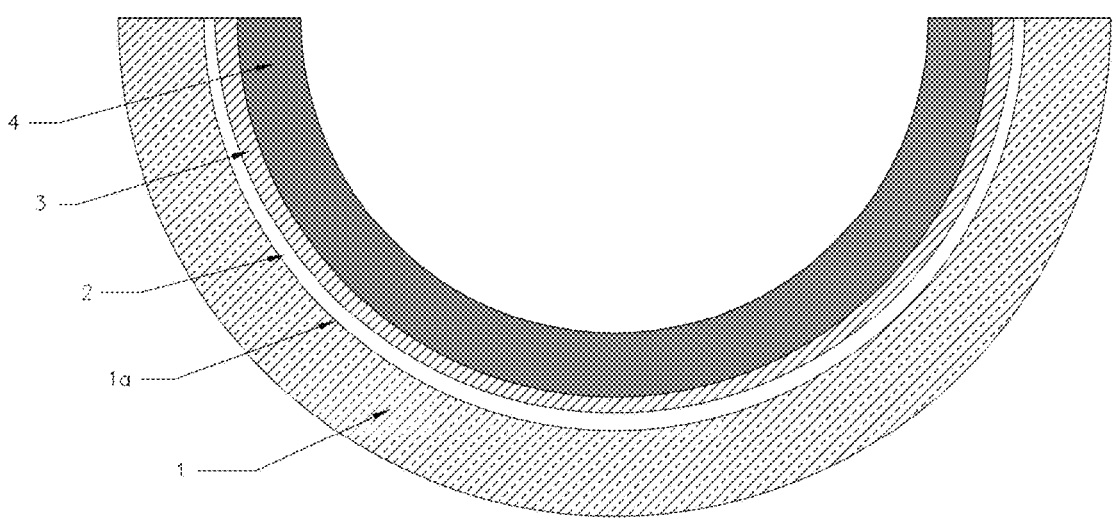
FIG. 1 illustrates a cross section of the steel pipe 1, which includes the coating as described in the present invention.
Figure 2:
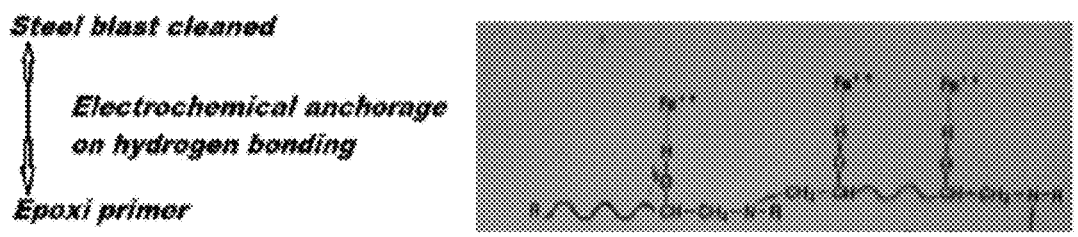
FIG. 2 shows a diagram which represents the chemical bonds formed through electron sharing by groups on the substrate and epoxy resin.

The epoxy resin having free hydroxyl groups adheres to the metallic surface because of the chemical bonds formed through electron sharing by groups on the substrate and the free hydroxyl groups of the epoxy resin, the curing is accompanied by polarity change (See FIG. 2).

It will be understood that the curing phenomenon of epoxy resin compositions involves chemical linking between polymer chains and that this linking (or "crosslinking") mechanism is initiated almost immediately upon application of the epoxy resin upon a hot surface and continues as the epoxy resin composition melts, coalesces and gels. Examples of preferred epoxy resins having free hydroxyl groups useful in the present invention are Epoxy, Phenolic Epoxy, Polyurethane Epoxy, and/or Novolac®.

The thickness of the layer of epoxy resin is at least 30 microns, preferably between 30 and 250 microns.

Thermoplastic Adhesive

In the preferred method for manufacturing described in the present documentation, the adhesive (3) is of the thermoplastic type and it allows a chemical bond with the epoxy of the first layer (2) so as to obtain full adherence to the metal.

Figure 3:
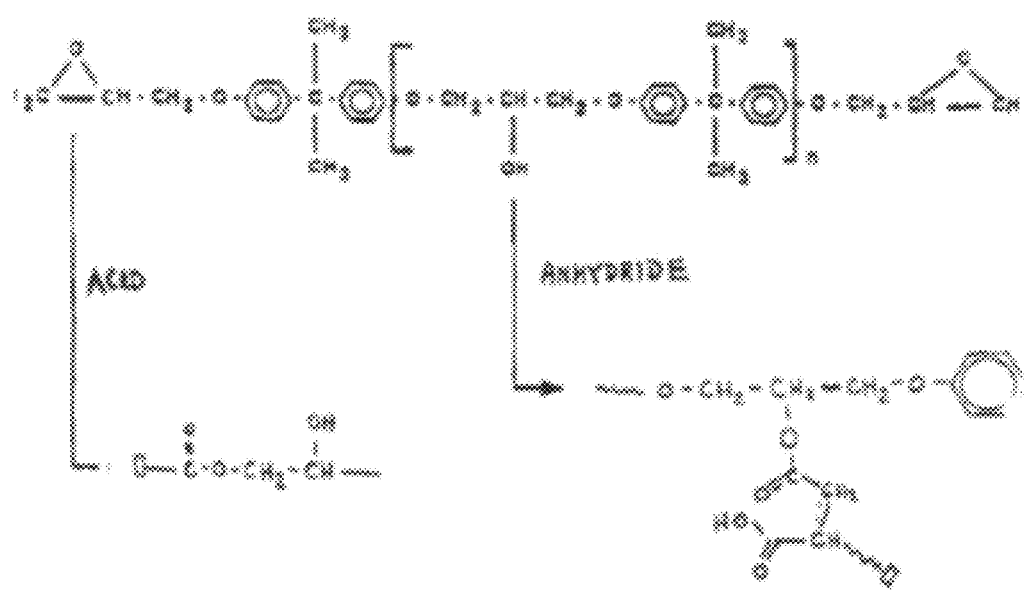
FIG. 3 shows a diagram that represents the chemical structure of the thermoplastic adhesive of the present invention.

The thermoplastic adhesive used in the present invention may be Anhydride modified polyolefin or acrylic acid modified polyolefin, since the epoxy resins have free hydroxyl groups anhydride or acrylic acid adhesive that can react to form very strong bonds to the epoxy (See FIG. 3)

Epoxy resin combines very low permeability to oxygen with excellent adhesion to properly prepared metallic surfaces and excellent resistance to cathodic disbondment. However, it is permeable to moisture, and is easily damaged by mechanical impacts. It is therefore beneficial to cover the epoxy resin with a layer of a polymer that is highly resistant to moisture permeation and resistant to impact damage.

Polyolefin coatings are widely used to protect metal pipelines, especially oil and gas pipelines, from both corrosion and mechanical damage. Unfortunately, the actual thermoplastic internal coating or polyolefins liners are not bonded to epoxy resin. The present invention uses modified polyolefins that contain polar groups to bond to the epoxy resin layer.

It is to be understood that the term "modified polyolefin", as used in the present invention, includes not only a polyolefin that is modified with an unsaturated carboxylic acid or an anhydride thereof, that is, a polyolefin copolymerized with the unsaturated carboxylic acid or the anhydride thereof, but also includes a blend of a polyolefin modified with the unsaturated carboxylic acid or anhydride thereof and an unmodified polyolefin.

The epoxy resin free hydroxyl-groups and the carboxylic acid dimer hydrogen bonding produces an epoxy resin-anhydride system. The gelation phase of reaction exhibits rapid initial hydroxyl-anhydride reactions.

The acid or anhydride modified polyolefins of the invention are, in most cases, acid or anhydride modified polyethylenes, polypropylenes, or combinations thereof. Most preferably the polyolefins of the invention are acid or anhydride modified polypropylenes, acid or anhydride modified polypropylene derivatives, or mixtures of these. The acid or anhydride modified polyolefin component of the invention may also be mixtures of acid or anhydride modified polyolefins with unmodified polyolefins. Preferably, if the emulsion comprises several polyolefins, most of the polyolefins have grafted thereto at least one acid or anhydride. The acids or anhydrides grafted on the polyolefins may be, in particular, ethylene-substituted carboxylic acids and/or polycarboxylic acids and/or acid anhydrides, such as, for example, maleic, acrylic, methacrylic, itaconic or citraconic acid (or anhydride). Most preferably the acid or anhydride modified polyolefins of the invention are maleic anhydride modified polypropylenes.

Examples of preferred acid or anhydride modified polyolefin dispersions useful in the present invention are maleic anhydride grafted polypropylene dispersions such as Hydrosize XM-10075, Hydrosize PP2-01, Hydrosize PPI-OI (all from Hydrosize Technologies, Inc., Raleigh, N.C.) and Michem Emulsion 91735 (available from Michelman, Inc., Cincinnati, Ohio).

The thickness of the layer of the adhesive is at least 50 microns, preferably between 50 and 300.

Polyethylene

The inventor noted that the modified polyolefin coating layer was strongly bonded onto the metal surface. However, when the coating layer is contacted with an aqueous solution containing an electrolyte such as brine or a solution of salt, the polyolefin coating layer peels off from the metal surface, and impact strength of the metal article deteriorates drastically.

The solution was to add a layer of polyethylene (4) directly over the thermoplastic layer (3). This affords an internal protection which is very efficient against abrasion and corrosion caused by fluids transported through the steel pipe (1).

Polyethylene is of low strength, hardness and rigidity, but has a high ductility and impact strength as well as low friction. Polyethylene is an excellent chemical resistance and includes nonpolar, saturated, high molecular weight hydrocarbons. In addition, Polyethylene absorbs almost no water.

When the layers of adhesive and polyethylene are heated, the molecular structure of both changes from a crystal state to an amorphous state. When pressure is applied, the molecules of adhesive and polyethylene fuse and mix since they are both thermoplastic.

As they cool down, the molecules of both thermoplastic materials (Adhesive+Polyethylene), return to their crystal state, forming a homogeneous interface and acquiring the same resistance of each component material.

In the present case, the plastic that makes up the third layer (4) is selected from a low, mid, or high-density polyethylene, or a linear one. In all cases, it is a layer of polyethylene coming from some form of polymerization of ethylene.

The polyethylene can be low, mid, or high-density, or lineal, with or without antioxidants, with or without additives, for UV-prevention.

It has been found that the effectiveness of the bond is characterized by the density or specific gravity of the particular material used. Accordingly, when reference is made to a high density polyethylene material, it is meant to refer to those polyethylene materials having a density or specific gravity of from 0.941 to 0.965, and a melt index of from 0.2 to 5. A medium density polyethylene material is one having a density or specific gravity in the range of from 0.926 to 0.940, and a melt index of from 0.3 to 22, while a low density polyethylene material is one having a density or specific gravity of from 0.910 to 0.925 and a melt index of from 0.3 to 22. Linear low density polyethylene material is one having a density or specific gravity in the range of from 0.915 to 0.940 g cm$^{-3}$.

Polyethylene is classified as a "thermoplastic" in view of the way the plastic responds to heat. Thermoplastic materials become liquid at their melting point (110-130 degrees Celsius in the case of LDPE and HDPE respectively). A major useful attribute about thermoplastics is that they can be heated to their melting point, cooled, and reheated again without significant degradation. Instead of burning, thermoplastics like Polyethylene liquefy, which allows them to be easily [injection molded] and then subsequently recycled. By contrast, thermoset plastics can only be heated once (typically during the injection molding process).

The advantage of the above system lies in the fact that the epoxy coating provides good corrosion protection to the underlying steel pipeline, and the polyethylene layer provides excellent abrasion and impact resistance and acts as a complete barrier to the underlying pipe surface The polyethylene layer, once it has cured, provides a tough, flexible and impermeable protective coating.

Advantageously the coating has a thickness between 1 mm to 5 mm.

The epoxy resin layer (2) is applied onto the inner surface (1a) of the steel pipe (1). Once the pipe has been burned (1) and later cleaned (abrasive blasting) with an abrasive material so as to eliminate contaminants, the inside surface (1a) of the pipe (1) will be clean and ready for the epoxy resin (2) to be applied.

Before applying the epoxy resin (2), the steel pipe (1) will be burned. In the burn-off step the temperature must be controlled so as not to alter the metallographic conditions of the steel pipe (1). For this reason, the burn-off temperature must not exceed 350° C. This temperature will easily eliminate oils, grease, and fuel residues that might be covering inside (1a) of the steel pipe (1). On the other hand, the applied temperature must not be lower than 100° C. since below that level the desired burn-off will not be achieved.

The abrasive blasting step seeks to prepare the inner surface (1a) of the steel pipe (1) by complementing the burn-off described in the previous step and, thus, improving the adherence of the epoxy resin (2). In the preferred method for manufacturing described, the abrasive blasting is done with non-contaminating material, preferably using $O_2Al_3$ grit.

Then comes a heating step whereby the pipe (1) is heated at a temperature of between 120° C. and 180° C. since this temperature improves the curing of the epoxy resin (2), which is applied at a later step before it completes its polymerization. In the preferred method for manufacturing in the present documentation, in the step where the steel pipe is heated the heat is applied onto the exterior surface of said steel pipe (1).

The next step involves applying a layer of epoxy resin on the inner surface (1a) of the steel pipe (1). The epoxy resin can be applied in liquid, granular, or powder form. Then a layer of thermoplastic adhesive (3) is applied directly onto the layer of the epoxy resin (2) while raising the temperature of the steel pipe (1), thus, achieving a chemical bond between said layer of epoxy resin (2) and layer of thermoplastic adhesive (3). This makes the thermoplastic adhesive (3) come into close contact with the epoxy resin (2). Hence, in the heating step where the temperature is raised, said epoxy resin (2) will be cured. The polymerization of the epoxy resin (2) and the fusion of the adhesive (3), which result from the step where temperature is raised to ensure a very strong chemical coupling due to union of the carboxyl groups and the epoxy groups. As in the previous heating step, in the step where the temperature is raised, the steel pipe 1 is heated from the outside, so that in both cases the temperature reaches the inner surface (1a) of said steel pipe (1) by conduction.

The temperature at which the steel pipe (1) is heated in the heating step depends on the thickness and diameter of the steel pipe 1. Of course, it is closely related to the composition and the temperature of the product that will be transported.

In the preferred method described in the present documentation, the temperature at which the steel pipe is heated ranges between 180° C. and 350° C.

The layer of polyethylene (4) is pressed against the layer of thermoplastic adhesive, while the steel pipe (1) is heated from the outside, thus, achieving the fusion between said adhesive and said plastic.

To determine the level of adherence to the metal, the inventors have conducted several trials following the CSA Standard Z 245.21-06 (Canadian Standard Association), Peel Adhesion (hanging mass) for System B1: >15.3 Kg/25 mm, 20° C.

The level of adherence obtained is higher than 15.3 Kg/25 mm at a temperature of 20° C.

Through the tests conducted, it is determined that the set of three layers on the inner surface of the steel pipe (1) can withstand sharp pressure drops at temperatures ranging from −30° C. to 65° C., in accordance to the prescribed values in the autoclave trial defined in the NACE TM0185 specification.

In compliance with the specification, it is subjected during 20 days to pressures of up to 273 atm and temperatures of up to 65° C. The fluids used in the trial were kerosene, toluene, and formation water with 12% ClNa.

Above, this document describes one possible method to produce the invention and the way the invention works. Additionally, this documentation is supplemented with a summary of the invention contained in the claims that are added below.

The invention claimed is:

1. An inner coating (10) providing anticorrosive and abrasive resistant protection for steel pipes (1) used for the transport of fluids, the coating includes:
   a layer of epoxy resin having free hydroxyl groups (2) applied directly onto the inner surface 1a of the steel pipe (1), the layer of epoxy resin is applied while heating an outer surface of the steel pipe;
   a layer of thermoplastic adhesive (3) applied directly onto the layer of epoxy resin, the layer of thermoplastic adhesive is applied while heating the outer surface of the steel pipe, the thermoplastic adhesive is anhydride modified polyolefin or acrylic acid modified polyolefin; and
   a layer of polyethylene (4), which is applied directly onto the layer of thermoplastic adhesive, the layer of polyethylene pressed against the layer of the thermoplastic adhesive while heating the outer surface of the steel pipe;
   wherein the inner surface of the steel pipe is given a pretreatment before applying the layer of epoxy, the pretreatment includes heating followed by abrasive blasting.

2. The coating of claim 1, wherein the coating has a level of adherence higher than 15.3 Kg/25 mm at a temperature of 20° C.

3. The coating of claim 1, wherein it withstands sharp pressure drops at temperatures ranging from 30° C. below zero to 65° C.

4. An internally lined steel pipe with an inner coating providing anticorrosion and abrasive resistant protection of the pipe, the coating includes:
   a layer of epoxy resin having free hydroxyl groups (2) applied directly onto the inner surface 1a of the steel pipe (1), the layer of epoxy resin is applied while heating an outer surface of the steel pipe;
   a layer of thermoplastic adhesive (3) applied directly onto the layer of epoxy resin, the layer of thermoplastic adhesive is applied while heating the outer surface of the steel pipe, the thermoplastic adhesive is anhydride modified polyolefin or acrylic acid modified polyolefin; and
   a layer of polyethylene (4), which is applied directly onto the layer of thermoplastic adhesive the layer of polyethylene pressed against the layer of the thermoplastic adhesive while heating the outer surface of the steel pipe;
   wherein the inner surface of the steel pipe is given a pretreatment before applying the layer of epoxy, the pretreatment includes heating followed by abrasive blasting.

5. An inner coating (10) providing anticorrosive and abrasive resistant protection for steel pipes (1) used for the transport of fluids, the coating consisting of:
   a layer of epoxy resin having free hydroxyl groups (2) applied directly onto the inner surface 1a of the steel pipe (1);
   a layer of thermoplastic adhesive (3) applied directly onto the layer of epoxy resin, the thermoplastic adhesive is anhydride modified polyolefin or acrylic acid modified polyolefin; and
   a layer of polyethylene (4), which is applied directly onto the layer of thermoplastic adhesive.

* * * * *